United States Patent Office 2,991,237
Patented July 4, 1961

2,991,237
THORIUM DISPERSION IN BISMUTH
Joseph S. Bryner, Eastport, N.Y., assignor to the United States of America as represented by the United States Atomic Energy Commission
No Drawing. Filed Apr. 3, 1958, Ser. No. 726,296
4 Claims. (Cl. 204—154.2)

This invention relates to a method of preparing stable dispersions of intermetallic compounds of thorium in a heavy liquid metal and to a stable dispersion thereof.

The isotope thorium-232 is valuable in producing the fissionable isotope uranium-233. The thorium-232, upon exposure to neutrons, undergoes a series of nuclear transformations which eventually yield uranium-233. In performing this conversion, the thorium may be flowed through an operating nuclear reactor; for example, it has been proposed to suspend the thorium in a liquid metal medium for this purpose. The liquid metals available for use under these conditions, because of the peculiar requirements, are few in number; they include lead and bismuth. Because of its good heat transfer characteristics, bismuth is the major part of the liquid metal medium and preferably is used alone. Bismuth is preferred for the purpose primarily because of its low thermal neutron capture cross section. Methods of forming suspensions of thorium in bismuth or in a lead-bismuth composition are described in my U.S. Patents Nos. 2,915,445 and 2,953,508. As noted in the patents referred to, it is desirable to flow the thorium liquid metal suspension through the reactor and through a heat exchanger in sequence. In this way it is possible to use the thorium liquid metal suspension not only to produce fissionable material but also to remove heat from the reactor. One of the difficulties engendered by this procedure is the result of the properties of the suspension. When suspended in bismuth or in lead bismuth, as described in the applications referred to, the thorium exists in a form of an intermetallic compound, thorium bismuthide, to which is ascribed the chemical formula $ThBi_2$. Particles of the thorium bismuthide, under certain conditions, have a tendency to deposit from the suspension, for example in any relatively cool channel through which it is pumped, such as in a heat exchanger or in relatively stagnant sections. Furthermore, the particles of thorium bismuthide have a tendency to grow and can reach a size of 1000 microns usually as agglomerates of smaller particles. As the particles grow, the pumping rates must be increased or other forms of mixing used to ensure that the particles remain in suspension.

A principal object of this invention is, therefore, to provide a method of stabilizing the particle size of suspensions of thorium bismuthide in heavy liquid metal heat transfer media, particularly bismuth. Another important object of the invention is to provide a stable suspension of thorium bismuthide in liquid bismuth. A further object of the invention is to prevent mass transfer of components of certain steels when they are used in a flow system for circulating thorium bismuthide suspensions in bismuth. A further object of the invention is to provide a method of removing deposits caused by mass transfer of the type just mentioned. Other objects of the invention will be in part apparent and in part pointed out hereinafter.

The objects of this invention are accomplished, broadly speaking, by incorporating in the thorium bismuthide suspension in liquid bismuth, a small amount of the element tellurium. In a suspension of this type, as little as 1 part by weight of tellurium to 100 parts of thorium is sufficient to inhibit particle growth and agglomeration during thermal cycling of the type that takes place in circulating such suspension through a nuclear reactor and a heat exchanger in sequence. In the usual case, in order to insure a fluid suspension, the thorium concentration will not exceed 12% by weight since above this concentration the viscosity increases sharply. As little as 1% thorium may be included in the suspension and still achieve a practical rate of production of the uranium-233. The amount of tellurium included in the suspension will generally not exceed 5% of the thorium. The reason for this is a practical one, that the addition of the tellurium reduces the number of neutrons available for capture by the thorium. However, the upper limit will generally depend on the amount of thorium present in the suspension; for example, when 1% thorium is used, the tellurium concentration should not exceed about 0.05% by weight of the composition while at 5% thorium 0.25% tellurium is considered permissible. In using the tellurium, one may add tellurium or a tellurium-bismuth alloy to the thorium bismuthide suspension. Preferably, however, thorium is added to the tellurium-bismuth alloy and treated in accordance with the methods of the applications referred to before.

The examples presented hereinafter illustrate several phases of the invention. It is to be understood that the invention is not limited to the details presented.

The following examples illustrate the performance of a suspension embodying this invention when subjected to thermal cycling.

EXAMPLE I

A 10-gram sample of thorium bismuthide in liquid bismuth was prepared. The thorium bismuthide particles were substantially equiaxial and had an average particle size of about 50 microns. The composition was 5 weight percent thorium, 94.5 weight percent bismuth and 0.5 weight percent tellurium. The fused dispersion was encapsulated in a graphite container mounted on a tilting device which rocked the container at the rate of 6 cycles per minute. One end of the container was maintained at 350° C. and the other at 580° C. This device simulates thermal cycling by causing the liquid suspension to flow periodically to the cold zone and to the hot zone.

The experiment was run for 500 hours at the constant rate of 6 cycles per minute. At the end of that time, a careful examination revealed that there was no increase in the particles size of the thorium bismuthide particles, that their shapes had remained essentially unchanged and that there was no deposition of solids at the cold end of the capsule.

In a similar experiment with a suspension containing only 5 weight percent thorium, balance bismuth, other conditions being substantially the same, the maximum dimension of the particles grew from 50 microns to 225 microns on an average. Most of this increase in size was the result of particle agglomeration.

EXAMPLE II

In an experiment identical with Example I, except that the suspension contained 10% thorium, 0.10% tellurium and 89.9% bismuth, by all weight, the same results were obtained.

A flowing suspension of thorium bismuthide in liquid bismuth is very corrosive to ferrous alloys. The best alloys for containing this material were found to be the chromium-molybdenum steels which are referred to as "Croloy." However, even though these are the best available, they are still subject to corrosion by mass transfer. In the mass transfer process, the alloy dissolves in the flowing suspension at a relatively hot zone in the circulation system and then deposits in a relatively cold zone. When this process takes place, the thorium also deposits from the suspension in the cold zone. While there may be a relationship between the two processes, it has not been definitely determined. The problem, however, is an acute one and the present invention furnishes a solution as illustrated in the following examples.

EXAMPLE III

A sample weighing 25 grams and having the composition and other characteristics of the suspension of Example II, was encapsulated in a chrome-molybdenum steel container. The steel was Croloy 2¼ (2¼% chromium; 1% molybdenum). The container was placed in the tilting apparatus, which was operated at the same rate as in Example I, for 500 hours. The hot end of the container was maintained at 550° C. and the cold end at 350° C. At the end of 500 hours, the container was radiographed. There was no discernible deposit at the cold end of the container.

In an experiment under conditions identical to those just described, except that the tellurium was omitted and replaced by bismuth, it was found at the end of 500 hours, that virtually all of the thorium was deposited as a solid in the cold end of the container. Microscopic examination of the solid deposit revealed a layer due to mass transfer corrosion of the steel had deposited first and that this deposit was followed by a deposit containing the thorium.

As disclosed in application S.N. 511,442, filed May 26, 1955, now Patent No. 2,840,467, issued June 24, 1958, for James E. Atherton et al., zirconium has the property of inhibiting the corrosion of steels of the chrome-molybdenum type by liquid bismuth or liquid bismuth containing dissolved uranium. A composition consisting of 10% by weight thorium, 0.025% zirconium, balance bismuth was run in a test similar in all respects to that described in the last paragraph. The results were the same as if the zirconium had not been present.

EXAMPLE IV

In an experiment similar to Example III, a liquid composition consisting of 10% by weight thorium, 0.025% tellurium, balance bismuth, was circulated between the hot and cold ends of the container for the same period of time. At the end of the time, 500 hours, there was only a detectable deposit on the container walls at the cold end, as determined by radiographing.

The following example illustrates the effect of tellurium on the maximum particle size of the thorium bismuthide.

EXAMPLE V

A series of suspensions of thorium bismuthide, $ThBi_2$, of 5 weight percent thorium in bismuth was prepared. The thorium bismuthide had a maximum particle size of 60 microns. To one of the samples no tellurium was added and to the others, various percentages, as shown in Table 1. A second series of suspensions was prepared containing 10% thorium by weight and these had a maximum particle size of 40 microns. The percentages of tellurium in these samples are also shown in Table 1; in each case, the balance of the suspensions was bismuth.

All of the samples were maintained at 800° C. for 16 hours. This furnishes an accelerated test of crystal growth by the single crystal mechanism. This mechanism, generally speaking, is such that the larger crystals grow at the expense of the smaller, i.e., the smaller crystals appear to dissolve and re-precipitate on the surface of the large crystals. This is in contrast to agglomeration where a plurality of single crystals more or less loosely combine in a single particle but, to a large extent, retain their individuality.

Table 1

| 5% Thorium by Weight | | 10% Thorium by Weight | |
|---|---|---|---|
| Wt. Percent Tellurium | Maximum Particle Size (microns) | Wt. Percent Tellurium | Maximum Particle Size (microns) |
| 0 | 120 | .2 | 55 |
| 0.5 | 60 | .1 | 55 |
| 0.2 | 60 | .05 | 66 |
| 0.1 | 60 | | |
| 0.05 | 60 | | |
| 0.025 | 70 | | |

These results and the results of many other experiments indicate that the tellurium does not completely prevent particle growth but it does limit the maximum particle size, particularly of agglomerates formed. The maximum particle size is the important parameter.

The following example illustrates the efficacy of the inclusion of tellurium in the thorium bismuthide-bismuth suspension in removing a deposit already formed by mass transfer and deposition of the thorium bismuthide, as described under Example III.

EXAMPLE VI

A bismuth suspension of neutron-irradiated thorium bismuthide in bismuth containing about 7% thorium in the fluid stream and about 0.08% tellurium was pumped through a flow system in which there was a cool zone and a hot zone. When charged into the system, the suspension also contained 0.025% zirconium. As the neutron-irradiated thorium is radioactive, it is possible to detect solid deposits.

After a period of circulation, much longer than in the absence of tellurium, it was noted the velocity of the stream was reduced from 1.5 feet per second to 0.4. A solid deposit was detected in the cool zone. In an attempt to remove the deposit, the entire flow system was brought to a single temperature of 450° C. and the fluid was pumped isothermally for an extended period to remove the deposit. The deposit was unaffected so far as could be detected.

The fluid was then removed from the flow system and sufficient tellurium-bismuth alloy added to bring the concentration of the tellurium up to 0.51 weight percent. After a period of stirring to bring the suspension of equilibrium, the suspension was replaced in the flow system and circulated isothermally at 450° C. at a velocity initially of 0.4 foot per second. After circulation at this rate for six hours, there was a substantial reduction in the size of the solid deposit, as measured by counting the radiation emitted from the deposit. After 45 hours, the fluid was removed and the pipe was radiographed. Substantially none of the deposit remained.

Since many embodiments might be made in the present invention and since many changes might be made in the embodiment described, it is to be understood that the foregoing description is to be interpreted as illustrative only and not in a limiting sense.

I claim:

1. A method of inhibiting particle growth in the suspension of thorium bismuthide in a liquid bismuth medium consisting essentially of adding from an external source about 0.5% by weight of composition of tellurium to said suspension to stabilize the particle size of the thorium bismuthide.

2. A method of inhibiting particle growth in a suspension of thorium bismuthide in a liquid bismuth medium consisting essentially of adding from an external source to said suspension at least one part by weight of tellurium to each 100 parts by weight of thorium, said thorium being present in an amount of from 1.0% to 12.0% by weight of composition.

3. A method of inhibiting particle growth in, and corrosion of a ferrous metal by, a suspension of thorium bismuthide in liquid bismuth consisting of adding from an external source at least one part by weight of tellurium to said suspension for every 100 parts of thorium, said thorium being present in an amount of from 1.0% to 12.0% by weight of composition.

4. A method of dissolving a solid deposit formed by mass transfer and by solids deposition in a ferrous metal circulation system through which a suspension consisting of thorium bismuthide and liquid bismuth have been circulated, said method comprising adding about 0.5% by weight of composition of tellurium to the suspension medium and circulating it over said deposit to transfer it to the flowing suspension.

References Cited in the file of this patent

UNITED STATES PATENTS

| | | |
|---|---|---|
| 1,166,721 | Smith | Jan. 4, 1916 |
| 2,785,047 | Brown | Mar. 12, 1957 |
| 2,863,759 | Steinberg | Dec. 9, 1958 |

OTHER REFERENCES

Proceedings of the International Conference on the Peaceful Uses of Atomic Energy, August 1955, vol. 3, pages 128, 131. Publ. by United Nations, New York.

Hampel: "Rare Metals Handbook," Reinhold Publishing Corp., New York (1954), page 405.

Friend: "A Text Book of Inorganic Chemistry," Charles Griffin & Co., London (1931), vol 7, part 2, page 352.